United States Patent [19]

Kuo et al.

[11] Patent Number: 4,513,067
[45] Date of Patent: Apr. 23, 1985

[54] INORGANIC NON-AQUEOUS CELL

[75] Inventors: Han C. Kuo, Burlington; Donald L. Foster, Somerville; Carl R. Schlaikjer, Winchester; Mysore L. Gopikanth, Burlington; Arabinda N. Dey, Needham, all of Mass.

[73] Assignee: Duracell Inc., Bethel, Conn.

[21] Appl. No.: 509,691

[22] Filed: Jun. 30, 1983

[51] Int. Cl.$^3$ .............................................. H01M 6/14
[52] U.S. Cl. .................................... 429/101; 429/196; 429/199; 429/218
[58] Field of Search ............... 429/101, 103, 194, 196, 429/199, 218, 220

[56] References Cited

U.S. PATENT DOCUMENTS

| | | | |
|---|---|---|---|
| 3,508,966 | 4/1970 | Eisenberg | 429/199 |
| 3,567,515 | 3/1971 | Maricle et al. | 429/218 |
| 4,330,601 | 5/1982 | Dey | 429/105 |
| 4,367,268 | 1/1983 | Behl | 429/196 |
| 4,409,303 | 10/1983 | Bowden | 429/105 |

OTHER PUBLICATIONS

Bulletin No. 12-100; Noury Chemical Corporation, Mar. 1981.

Primary Examiner—Anthony Skapars
Attorney, Agent, or Firm—Ronald S. Cornell; Israel Nissenbaum

[57] ABSTRACT

A novel inorganic non-aqueous electrochemical cell having an alkali or alkaline earth metal anode, an inorganic electrolyte comprised of an $SO_2$ solvent with an alkali or alkaline earth metal halide salt of aluminum, tantalum niobium or antimony, dissolved in the $SO_2$ and a cathode comprised of a carbonaceous material having an apparent bulk density in excess of 5 lb/ft$^3$ (80 gm/l). Lower bulk density carbonaceous material may, however, be used in electrolytes having high salt concentrations. Ketjenblack EC (furnace black) carbonaceous material may be admixed with a solid cathode active material which is substantially insoluble in the $SO_2$ electrolyte to provide a high primary cell capacity and an effectively rechargeable cell. There is no $SO_2$ per se discharge in the cell.

20 Claims, No Drawings

INORGANIC NON-AQUEOUS CELL

This invention relates to non-aqueous electrochemical cells and more particularly to inorganic cells containing $SO_2$ electrolytes.

Commercial electrochemical cells, referred to as lithium/$SO_2$ cells, typically contain lithium anodes and electrolytes comprised of a salt such as LiBr dissolved in a solvent mixture of liquified $SO_2$ and an organic cosolvent such as acetonitrile. The cathodes in such cells are usually comprised of a carbon black such as Shawinigan Black (acetylene black) on an expanded metal substrate. Discharge of the cell results in the formation of the anode metal dithionite at the carbon cathode surface. In such cells the $SO_2$ fluid cathode depolarizer reacts directly with the anode metal cations to form such dithionite product. Since the cell reaction is a direct one between the anode and the fluid cathode depolarizer the carbon cathode only provides a catalytic surface for such reaction. As a result the low bulk density of materials such as Shawinigan Black (1.2 lb/ft$^3$-19.2 gm/l) is a favorable one since smaller amounts of the catalytic carbon are required to fill up a given volume. Recharging of such cells is however complicated and rendered inefficient by the presence of the organic cosolvent.

In some cells in which the sulfur dioxide functioned as the only solvent, (i.e. without organic cosolvents) fluid cathode depolarizers such as $IBr_3$ were utilized and in such cells the cathode similarly functioned to provide a catalytic surface for the electrochemical reaction of the cell. In other cells such as described in U.S. Pat. No. 3,493,433 materials such as silver chloride (AgCl) in an Ag.AgCl cathode were utilized in cells in which the $SO_2$ was the electrolyte solvent. Such cells could function as described, only with large amounts (over 60%) of silver in the cathode and primary capacity suffered as a result. In said patent a rechargeable cell with an $SO_2$ active material was also described wherein the cathode was nickel.

It is an object of the present invention to provide a novel inorganic rechargeable cell system having an electrolyte comprised of $SO_2$ but wherein the $SO_2$ per se does not function as the cathode depolarizer.

It is a further object of the present invention to provide such cell wherein the primary capacity of solid active cathode depolarizers is substantially enhanced over analogous cells containing the same depolarizer materials.

It is a still further object of the present invention to provide such cell wherein a carbonaceous cathode functions in a reactive rather than a catalytic fashion with high capacities being obtained.

These and other objects, features and advantages of the present invention will become more evident from the following discussion.

Generally the present invention comprises an inorganic non-aqueous electrochemical cell having an alkali or alkaline earth metal anode preferably of lithium (including mixtures and alloys thereof) and an electrolyte comprising one or more salts, soluble in $SO_2$, selected from alkali or alkaline earth metal halide salts of aluminum, tantalum, antimony, or niobium and which provide ionically conductive solutions with the $SO_2$, with such salt or salts being dissolved in $SO_2$ without organic cosolvents. The cathode is comprised of a conductive carbonaceous material having an apparent bulk density in excess of about 80 gm/liter. Lower bulk density carbonaceous materials may however be effectively utilized as the sole cathode material when used in conjunction with a concentrated salt electrolyte, i.e., one in which the salt of $SO_2$ mole equivalent ratio does not exceed 1:7.

It has been unexpectedly discovered that in cells having the above described electrolyte, the $SO_2$ which would normally be discharged at the carbon cathode surface is not in fact so discharged since no dithionite formation is detected. Furthermore, the cells discharge at voltages well above the normal discharge voltage of the $SO_2$, i.e., about 3.2 volts as compared to 2.9 volts. Additionally, it has been unexpectedly discovered that the cell is dischargeable with high capacity over a hundred cycles with little or no loss of primary capacity.

The above described cell system has also unexpectedly shown remarkable enhancement of primary capacity in cells wherein solid cathode active depolarizer materials such as AgCl are admixed with small amounts of specific carbonaceous material. It is however noted that not all solid active cathode materials provide a synergistically enhanced capacity when admixed with the specific carbonaceous material.

Examples of carbonaceous materials having apparent bulk densities in excess of 80 g/l which are generally utilizable in the cathode of the present invention include furnace blacks and channel blacks as well as graphite. It is preferred that the carbonaceous material be conductive to facilitate the cell reaction. Furnace blacks which are more conductive are accordingly preferred. Materials such as Ketjenblack EC (a highly conductive furnace black available from Noury Chemical Corporation with properties as described in Noury Chemical Corporation Bulletin No. 12-100 March, 1981) having much higher conductivities are more preferred, with Ketjenblack EC being the most preferred. Other commercially available carbon blacks include those of the Cabot Corporation such as Elftex-12, Mogul-L, Regal 660-R, Vulcan XC-72R, Monarch-7000 and Sterling R (all furnace blacks). Carbon blacks available from Columbian Corporation include Neo Spectra AG and Royal Spectra (channel blacks) and Conductex-950 (furnace black). The bulk densities of the aforementioned carbon blacks range from about 6-17 lb/ft$^3$ with graphite having an apparent bulk density of about 140 lb/ft$^3$. The effect of the large apparent bulk density of the graphite is however somewhat negated by its comparatively small BET surface area of about 20 m$^2$/gm which is considerably smaller than the 1000 m$^2$/gm of the Ketjenblack EC. The BET surface areas of the other described carbon blacks generally fall between the graphite and Ketjenblack EC values.

It is believed that the carbonaceous material takes some part in the cell reaction since there is no detected dithionite formation on cell discharge. As a result it is of importance that the carbonaceous material utilized in the cathode be volumetrically practical since electrochemical cells are generally volumetrically rather than gravimetrically restricted. An apparent bulk density of the carbonaceous material should exceed about 80 gm/liter in order that sufficient carbon material be present for reactive purposes with a useful capacity being achieved thereby. In fact in co-pending application Ser. No. 186,868, filed Sept. 12, 1980, a cell with a 1M LiAlCl$_4$ in $SO_2$ electrolyte and a cathode made of the standard carbon black for $SO_2$ cells (i.e. low bulk density Shawinigan black) provided minimal capacity and was deemed unsuitable for both primary and rechargeable cells.

The electrolyte salts in the cell of the present invention should be sufficiently soluble in liquid $SO_2$ without organic cosolvents (thereby excluding many commonly utilized salts such as LiBr) to provide an ionically conductive solution. Additionally, the electrolyte salt should interact with the $SO_2$ solvent whereby discharge of the $SO_2$ per se is substantially retarded or prevented. Such salts include the alkali and alkaline earth metal halide salts containing aluminum, tantalum, niobium and antimony and specifically those having $AlCl_4^-$, $TaCl_6^-$, $NbCl_6^-$, $SbCl_6^-$, and $SbCl_6^{-3}$, anions particularly of the anode metal such as lithium. The electrolyte may be pressurized or may be in the non-pressurized state as described in co-pending application Ser. No. 405,980, filed Aug. 9, 1982, i.e. with a salt to $SO_2$ mole equivalent ratio not in excess of 1:7. In such low pressure electrolytes even low bulk density carbons such as Shawinigan Black may be effectively utilized. On the other hand, electrolyte salts such as $LiGaCl_4$ (which is more conductive than the analogous $LiAlCl_4$) and $LiInCl_4$ permit the normal reaction of the $SO_2$ with the electrochemical reaction product formation of dithionite. Such salts are accordingly not within the purview of the present invention.

It is believed that electrolyte salts of the present invention complex with the sulfur dioxide to form a new species which in turn complexes with surface functional groups of the carbonaceous material. Reaction thereafter of the complexed groups in the electrochemical reaction is further believed to be enhanced by either or both high surface area and high conductivity of the carbonaceous material with greater surface area and/or conductivity causing a greater extent of discharge.

The carbonaceous materials such as Ketjenblack EC and other equivalent carbonaceous materials, when admixed with other solid cathode active materials, takes part in the cell reaction and enhances discharge performance of such cathode active materials. Such activity by the Ketjenblack EC is evidenced by the high voltages obtained initially. For example AgCl normally is dischargeable at about 2.8–2.9 volts versus a lithium anode whereas initial discharge of such AgCl cathode having the Ketjenblack EC, carbonaceous material in the environment of the present invention provides an initial voltage of about 3.2 volts. Between 30%–8% by weight of the cathode is a preferred range for the Ketjenblack materials with 10%–15% being most preferred. Because of its relatively high conductivity only small amounts are necessary for effective utilization and the providing of a synergistic effect.

There is a synergistic effect in such cells wherein the capacity of cathodes such as of AgCl may be increased by several times with the addition of small amounts (e.g. 10–12%) of the carbonaceous material such as Ketjenblack EC. The capacity of the 10–12% carbonaceous material, as extrapolated from cells containing only such material as the cathodes, does not, however, account for such tremendous increase in capacity.

The solid active cathode materials which may be admixed with Ketjenblack EC, and the like which provides such synergistic effect include metal and non-metal halides particularly chlorides (which are preferred because of their compatibility with the preferred chloride electrolytes) metal oxides; oxyhalides and metal chalcogenides. Specific examples of solid cathode active materials which display the aforementioned synergistic effect include $AgCl$, $AgBr$, $NiCl_2$, $CoCl_2$, $NiF_2$, $CrCl_3$, $MnCl_2$, $MoCl_3$, $FeCl_2$, $MoCl_5$, $PbCl_2$, $MoO_2Cl_2$, $SnCl_2$, $CuCl$, $FeBr_3$, $MnF_2$, $CuCl_2$, and $CuBr_2$.

In order to more fully illustrate the present invention the following examples are presented. It is understood that such examples are merely illustrative in nature and details contained therein are not to be construed as limitations on the present invention. Unless otherwise indicated all parts are parts by weight.

EXAMPLE 1

A prismatic cell is made with two lithium electrodes (each 4 cm×2.5 cm×0.05 cm) sandwiching a 2 gm cathode comprised of 90 parts Lonza KS-2 graphite and 10 parts polytetrafluoroethylene (PTFE) on a nickel screen. The electrodes are separated by nonwoven glass paper and the cell is filled with 20 grams of a low pressure electrolyte of $LiAlCl_4.2.5SO_2$ (about 9M $LiAlCl_4$). The cell has an OCV of 3.31 volts and is repeatedly discharged at 60 mA to a 2.6 volt cutoff and recharged at 30 mA to 4 volts for 110 cycles. The cell delivers 200 mAhrs to 280 mAhrs (110 to 155 mAhrs/gm of graphite) on each discharge cycle to the 2.6 volt cutoff. The cell reaction product is found to be LiCl not $Li_2S_2O_4$.

EXAMPLE 2

A cell is made with the same electrolyte and electrodes of the same dimensions of those in Example 1 but with three lithium electrodes sandwiching two cathodes. The cell is discharged at 120 mA and charged at 60 mA between 2.6 and 4 volts. The cell delivers about 400 mAhrs on each discharge to 2.6 volts and operates for 160 discharge/charge cycles until a short develops in the cell.

EXAMPLE 3

A cell is made as in Example 1 but with a cathode made with Shawinigan Black. The cathode is made by mixing 90 gm of the Shawinigan black with 1.1 liter of isopropanol and the gradual addition of 10 ml of PTFE. The resultant dough is pressed on the nickel screen to about 0.09 cm thickness. The cell is cycled between 2.6 and 4 volts at 40 mA discharge and charge rates and delivers over 240 cycles with a discharge capacity of about 90–120 mAhrs on each cycle. The cell has an OCV of 3.28 volts and discharges at an average voltage of about 3 volts. The primary capacity of the cell is about five times that achieved with the cell in co-pending application Ser. No. 186,868 in which relatively low concentration of electrolyte salt is utilized (1 molar in the aforesaid copending application as compared to the low pressure electrolyte of about 9 molar).

EXAMPLE 4

A cell is made as in Example 1 but with a cathode comprised of 1 gram of Ketjenblack EC furnace black with PTFE (9:1) and having a thickness of 0.17 cm. The cell has an OCV of 3.3 volts and is repeatedly discharged at 2.6 volts at 60 mA and recharged at 30 mA. The cell delivers about 300 mAhrs/gm of carbon on each cycle for 140 cycles with no loss in capacity at 75% depth of discharge.

EXAMPLE 5

A cell is made as in Example 4 and is cycled about 90 times at 100% depth of discharge and delivers about 400 mAhrs/gm of carbon with substantially no loss in capacity.

EXAMPLE 6

A cell is made as in Example 4 but with an electrolyte of LiAlCl$_4$.3SO$_2$ and is cycled at 40 mA discharge and 20 mA charge and delivers 400 mAhrs to 2.0 volts for 30 cycles and is still operating.

EXAMPLE 7

A cell is made as in Example 4 but with a 1M LiAlCl$_4$ in SO$_2$ electrolyte. The cell has an OCV of 3.3 volts and is discharged at 40 mA for 8 hours or to a 2.6 volt cutoff and is recharged at 40 mA for 20 cycles and is still operating.

EXAMPLE 8

A cell is made as in Example 1 but with a cathode weighing 1.9 grams comprised of AgBr admixed with Ketjenblack EC and PTFE (80:12:8) with a thickness of 0.08 cm, and an electrolyte of LiAlCl$_4$.3SO$_2$. The cell provides an OCV of 3.16 and a capacity 500 mAhr to a one volt cutoff at a 20 mA discharge rate. The capacity is about 230% of the theoretical capacity of the AgBr and is well in excess of the Ketjenblack EC additional capacity.

EXAMPLE 9 (Comparative)

A cell is made as in Example 8 but with a 1M LiGaCl$_4$-SO$_2$ electrolyte. The cell provides an OCV of 2.89 and a capacity of 190 mAhr to a one volt cutoff at a 20 mA discharge rate. The effect of the admixture with the Ketjenblack EC is apparent in Example 8 because of the higher voltage obtained whereas the synergistic effect is not apparent in the gallium salt containing electrolytes. In fact the obtained capacity is about 87% of theoretical.

EXAMPLE 10

A cell is made with Ketjenblack EC as in Example 8 but with a AgCl cathode weighing 2.0 grams with a thickness of 0.1 cm. The cell provides an OCV of 3.15 and a capacity of 800 mAhrs at a 20 mA discharge rate. The obtained capacity is about 267% of theoretical capacity.

EXAMPLE 11

A cell is made with Ketjenblack EC as in Example 10 but with a 1M LiAlCl$_4$-SO$_2$ electrolyte. The cell provides an OCV of 3.11 and a capacity of 805 mAhrs at a 20 mA discharge rate. The obtained capacity is about 126% of theoretical capacity.

EXAMPLE 12 (Comparative)

A cell is made as in Example 11 but with a 1M LiGaCl$_4$-SO$_2$ electrolyte. The cell provides an OCV of 2.88 and a capacity of 224 mAhrs at a discharge rate of 20 mA. The obtained capacity is about 75% of the theoretical capacity.

EXAMPLE 13

A cell is made with Ketjenblack EC as in Example 8 but with a CuBr$_2$ cathode with a thickness of 0.09 cm and an electrolyte of 1M LiAlCl$_4$-SO$_2$. The cell provides an OCV of 3.42 and a capacity of 890 mAhrs to a one volt cutoff at a 20 mA discharge rate. The obtained capacity is about 488% of the theoretical capacity.

It is understood that the above examples are only for illustrative purposes and that changes such as in cell components and ratios may be made without departing from the scope of the present invention as defined in the following claims.

What is claimed is:

1. A non-aqueous, electrochemical cell comprising an anode comprised of an alkali or alkaline earth metal, an inorganic electrolyte comprised of SO$_2$ having dissolved therein an alkali or alkaline earth metal halide salt containing aluminum, tantalum, niobium or antimony whereby said SO$_2$ per se is not a cathode active material characterized in that said cell contains a cathode comprised of a conductive carbonaceous material having an apparent bulk density in excess of 80 gm/liter.

2. The cell of claim 1 wherein said carbonaceous material is graphite.

3. The cell of claim 1 wherein said carbonaceous material is Ketjenblack EC and said cathode consists essentially of said Ketjenblack EC.

4. The cell of claim 1 wherein said carbonaceous material is Ketjenblack EC and said cathode further contains a solid active cathode material.

5. The cell of claim 4 wherein said solid active cathode material is selected from the group consisting of metal and non-metal halides, metal oxides, oxyhalides and metal chalcogenides.

6. The cell of claim 4 wherein said solid cathode active material is selected from the group consisting of AgCl, AgBr, NiCl$_2$, CoCl$_2$, NiF$_2$, CrCl$_3$, MnCl$_2$, MoCl$_3$, FeCl$_2$, PbCl$_2$, MoO$_2$Cl$_2$, SnCl$_2$, CuCl, FeBr$_3$, MnF$_2$, CuCl$_2$ and CuBr$_2$.

7. The cell of claim 6 wherein said metal halide salt contains an anion selected from the group consisting of AlCl$_4^-$, TaCl$_6^-$, NbCl$_6^-$, SbCl$_6^{-1}$ and SbCl$_6^{-3}$.

8. The cell of claim 7 wherein the mole equivalent ratio of said salt to said SO$_2$ is not greater than 1:7.

9. The cell of claim 6 wherein said metal halide salt is LiAlCl$_4$.

10. The cell of claim 8 wherein said anode is comprised of lithium.

11. A non-aqueous, electrochemical cell comprising an anode comprised of an alkali or alkaline earth metal, an inorganic electrolyte comprised of SO$_2$ with an alkali or alkaline earth metal halide salt containing aluminum, tantalum, niobium or antimony with the mole equivalent ratio of said salt to said SO$_2$ being no more than 1:7 whereby said SO$_2$ per se is not a cathode active material, characterized in that said cell contains a cathode comprised of a conductive carbonaceous material.

12. The cell of claim 11 wherein said carbonaceous material is acetylene black.

13. The cell of claim 11 wherein said carbonaceous material is graphite.

14. The cell of claim 11 wherein said carbonaceous material is Ketjenblack EC and said cathode consists essentially of said Ketjenblack EC.

15. The cell of claim 11 wherein said carbonaceous material is Ketjenblack EC and said cathode further contains a solid active cathode material.

16. The cell of claim 15 wherein said active cathode material are selected from the group consisting of metal and non-metal halides, metal oxides, oxyhalides, and metal chalcogenides.

17. The cell of claim 15 wherein said active cathode material is selected from the group consisting of AgCl, AgBr, NiCl$_2$, CoCl$_2$, NiF$_2$, CrCl$_3$, MnCl$_2$, MoCl$_3$, FeCl$_2$, PbCl$_2$, MoO$_2$Cl$_2$, SnCl$_2$, CuCl, FeBr$_3$, MnF$_2$, CuCl$_2$, and CuBr$_2$.

18. A non-aqueous, electrochemical cell comprising an alkali or alkaline earth metal anode, an inorganic electrolyte comprised of an $SO_2$ solvent having dissolved therein a salt having at least one alkali or alkaline earth metal cation and an anion containing at least one halogen atom and at least one member of the group consisting of aluminum, niobium, tantalum and antimony whereby said $SO_2$ per se is not a cathode active material, and a cathode comprising Ketjenblack EC carbon black admixed with a solid cathode active material.

19. The cell of claim 18 wherein the mole equivalent ratio of said salt to said $SO_2$ is no greater than 1:7.

20. A solvent-electrolyte system comprising a salt selected from the group consisting of alkali or alkaline earth metal tantalate, niobate, and antimonate chlorides dissolved in $SO_2$.

* * * * *